United States Patent [19]

Lohr

[11] 4,244,592
[45] Jan. 13, 1981

[54] CHILD'S RIDE-ON VEHICLE

[75] Inventor: Raymond J. Lohr, Erie, Pa.

[73] Assignee: Empire of Carolina, Inc., New York, N.Y.

[21] Appl. No.: 8,022

[22] Filed: Jan. 31, 1979

[51] Int. Cl.³ .................. A63G 19/00; B62M 1/00
[52] U.S. Cl. .......................... 280/1.192; 280/1.165; 280/1.183; 280/1.201
[58] Field of Search ............... 280/1.13, 1.167, 1.165, 280/1.183, 1.191, 1.192, 1.201, 1.204, 220, 226 R, 226 A

[56] References Cited
U.S. PATENT DOCUMENTS

| 862,015 | 7/1907 | Pittman | 280/1.201 |
| 1,500,033 | 7/1924 | Pollman | 280/1.183 |
| 1,708,090 | 4/1929 | Hague | 280/1.183 |
| 2,791,434 | 5/1957 | Wheeler | 280/1.204 |

Primary Examiner—John J. Love

[57] ABSTRACT

A ride on vehicle in the form of a shell with projecting members which are normally retracted within the shell and which are projected outwardly as a result of the weight of a child seated on the vehicle. The vehicle shell preferably simulates a turtle with retractable and extendable head and legs.

8 Claims, 6 Drawing Figures

U.S. Patent    Jan. 13, 1981    Sheet 1 of 4    4,244,592

CHILD'S RIDE-ON VEHICLE

BACKGROUND OF THE INVENTION

Ride on vehicles for children have been known, probably since the invention of the wheel. Small children enjoy vehicles which can be propelled by engagement between their feet and the riding surface. Children develop all sorts of play situations and fantasies and a goal of a new ride on vehicle is to stimulate the child's interest and hold the child's attention for reasonable periods of play.

SUMMARY OF THE INVENTION

Generally speaking, in accordance with the invention, a child's ride on vehicle is provided in the form of a shell which generally defines the seat portion of the vehicle and a handle for balance projecting from the shell. Wheels are mounted at the lower end of the shell for engagement with the ground and the dimensions of the vehicle are such that a young child can sit on the shell with feet touching the ground for propelling the vehicle. To provide added play value, component parts are mounted within the shell and are biased to a generally retracted position. The parts are operatively engageable to an extended position as a result of movement of a lever. In the preferred embodiment the lever is operatively connected to a seat which is pivoted on the shell. The seat operates the lever to advance the retractable elements when the child depresses the seat such as by sitting thereon. A vehicle as herein described is especially suitable for simulating a turtle.

Accordingly, it is an object of this invention to provide an improved ride on vehicle with members that may be projected and retracted in relation to the body or shell of the vehicle;

another object of the invention is to provide an improved toy vehicle with normally retracted members that may be projected outwardly of the vehicle body or shell;

a further object of the invention is to provide an improved toy vehicle in which the position of projectable and retractable members is controlled by the vehicle seat, generally in response to a child sitting thereon.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 2:
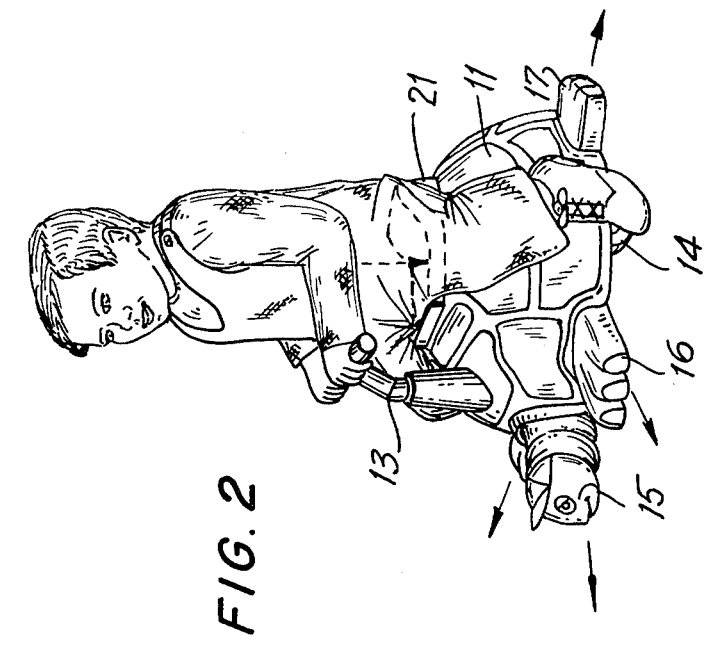
FIG. 2 is a perspective view of the vehicle of FIG. 1 with a child riding thereon and showing the elements advanced to a projected position.
Figure 1:
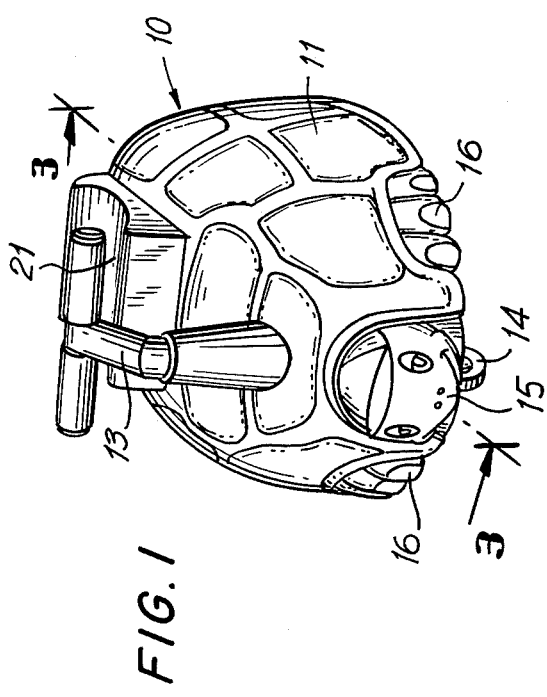
FIG. 1 is a perspective view of a child's ride on vehicle constructed in accordance with a preferred embodiment of the instant invention and showing elements normally biased to a retracted position.

Referring first to FIGS. 1 and 2, a child's ride on vehicle indicated generally at 10 is in the form of a shell 11 which acts as the body of the vehicle and which, in the preferred embodiment, simulates the appearance of the shell of a turtle. Mounted on the shell is a seat 21 and a handle 13 and FIG. 2 shows a child seated on seat 21 and gripping handle 13. Mounted at the bottom of the shell are a series of ground engaging wheels 14. Mounted for retraction within the shell are a series of members designed to simulate a turtle head 15, turtle front legs 16 and turtle rear legs 17.

Figure 3:
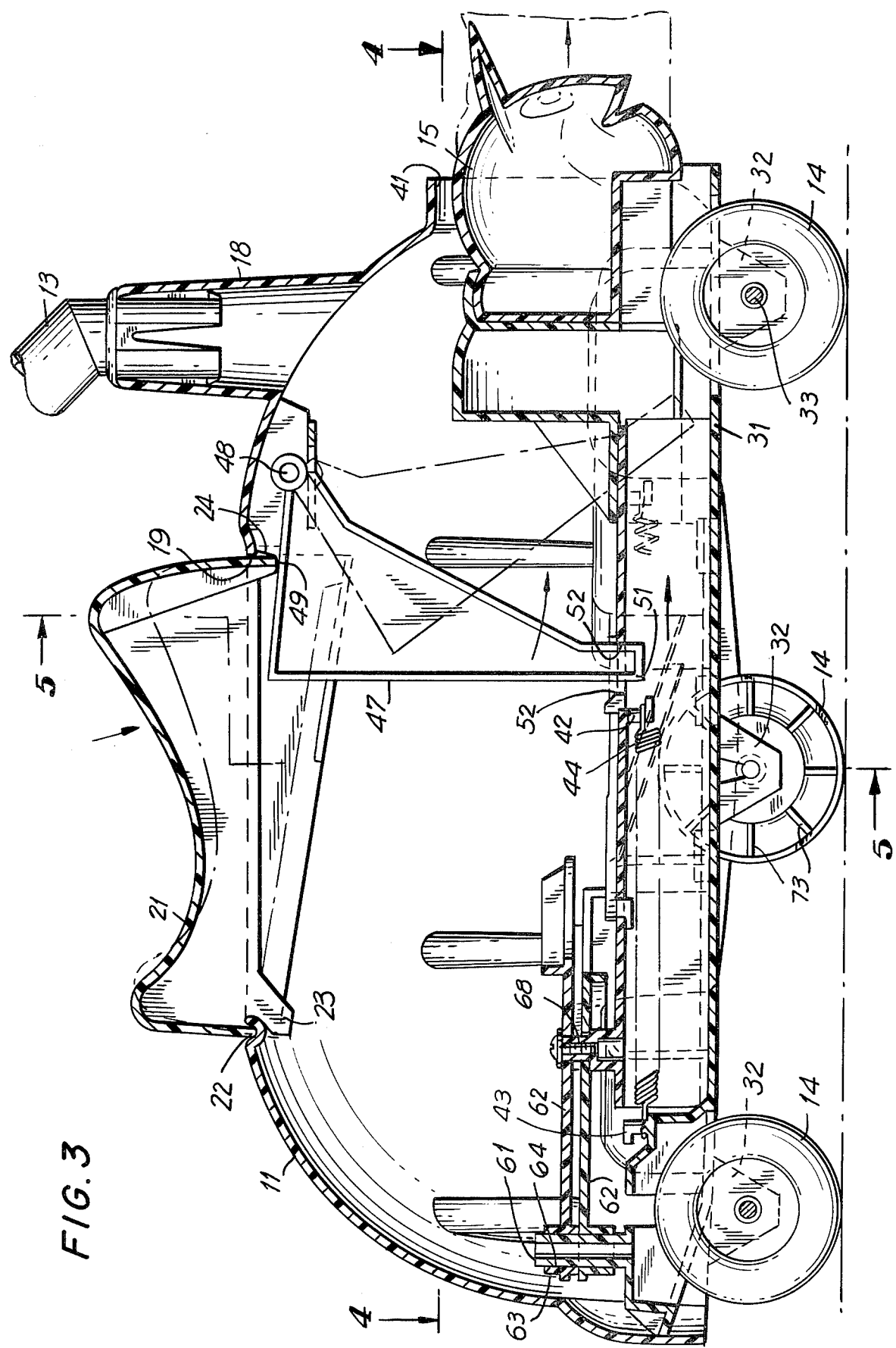
FIG. 3 is a sectional view taken along line 3—3 of FIG. 1.

Referring now to FIG. 3, shell 11 is shown as a hollow member preferably molded of plastic material and carrying an upstanding tube 18 at the forward end in which is mounted handle 13. An opening 19 is formed in the shell at the uppermost portion thereof for receiving a seat 21. A ridge 22 is formed at the rear edge of opening 19 for pivotal cooperation with projections 23 at the lower rear edge of seat 21. Opening 19 is of sufficient size to permit seat 21 to pivot within shell 11 along a rear pivot line defined by the cooperation between ridge 22 and projections 23. Stops 24 are provided at the forward edge of seat 21 and cooperate with shell 11 adjacent the forward edge of opening 19 to limit the movement of seat 21 during its pivoting movement in a counterclockwise direction as viewed in FIG. 3. The FIG. 3 view of seat 21 in full lines represents the normal position of the seat when no pressure is applied thereto.

Connected to shell 11 proximate the lower edge thereof is a bottom plate 31 carrying a plurality of downwardly projecting bearing plates 32 on which wheels 14 are mounted by means of a plurality of axial shafts 33.

Figure 4:
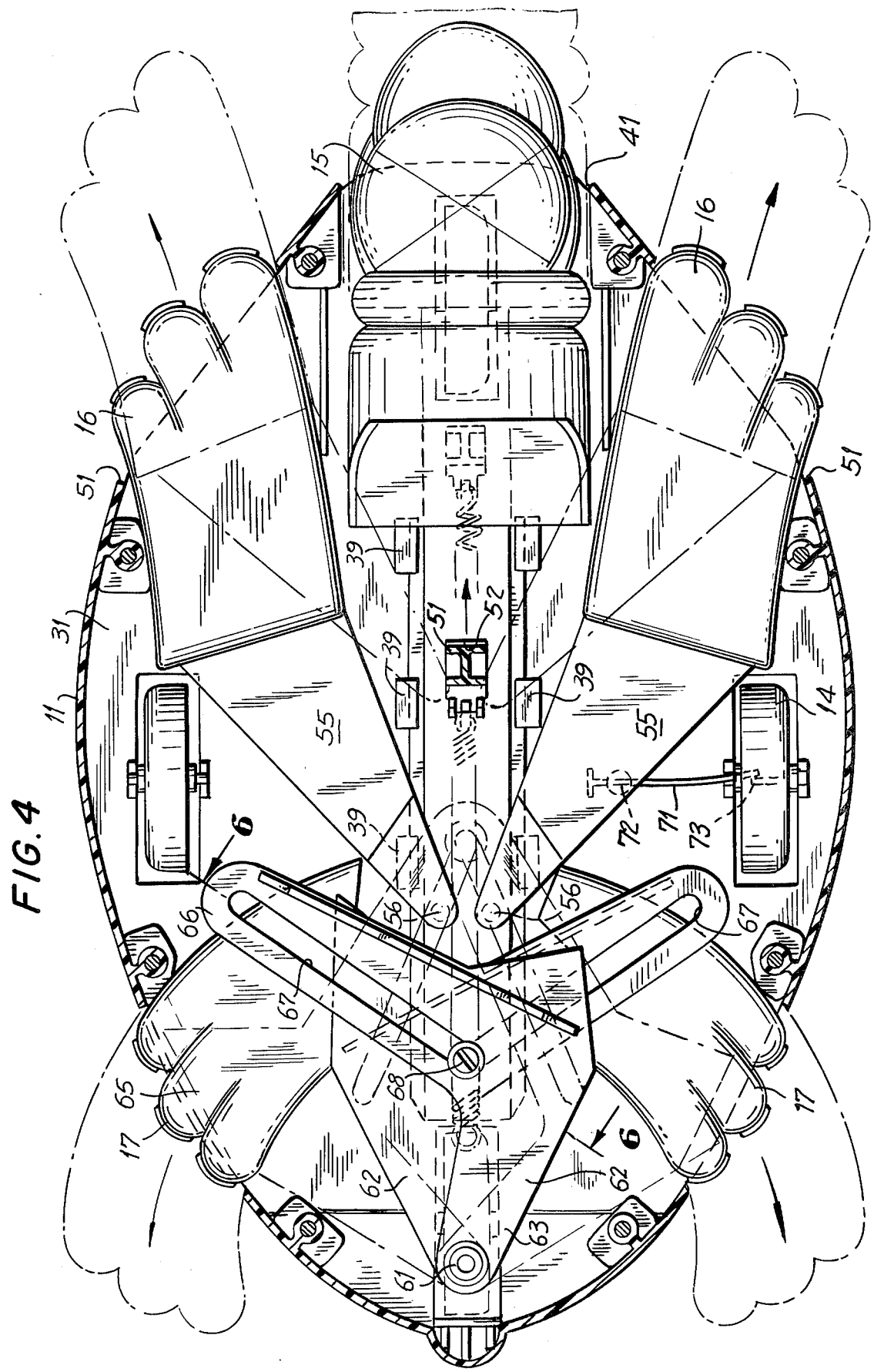
FIG. 4 is a sectional view taken along line 4—4 of FIG. 3.
Figure 5:
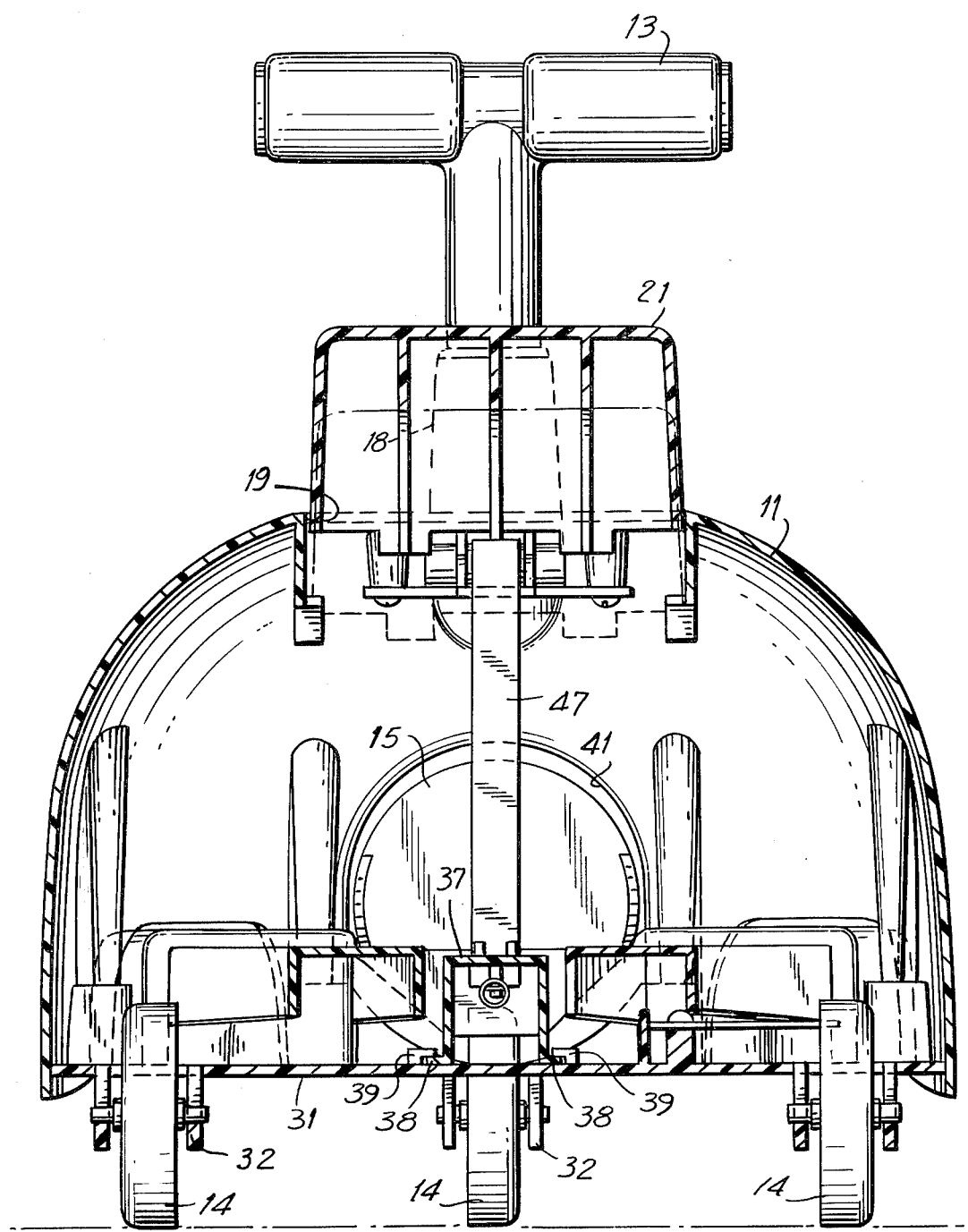
FIG. 5 is a sectional view taken along line 5—5 of FIG. 3.

Referring to FIGS. 3 through 5, a channel shaped member 37 having outwardly extending legs 38 is slidably mounted in engagement with the inner surface of bottom plate 31. Bottom plate 31 is formed with a series of ears 39 for receiving and guiding legs 38. Member 37 is formed at its forward end into turtle head 15 which extends through a head opening 41 formed at the forward end of shell 11. A boss 42 formed on channel shaped member 37 and a boss 43 formed on bottom plate 31 connect to opposite ends of a spring 44 for normally biasing channel shaped member 37 carrying turtle head 15 to a generally retracted position as indicated in full lines in FIGS. 3 and 4.

A lever 47 of the general configuration of a right triangle is pivoted by means of a shaft 48 to shell 11 at a position which is intermediate the forward edge of opening 19 and handle carrying tube 18. A lowermost forward edge 49 of seat 21 engages lever 47 in a cam action so as to pivot lever 47 in a counterclockwise direction when seat 21 is pivoted in a clockwise direction. The lowermost end 51 of lever 47 projects through an opening 52 in channel shaped member 37 for engagement with the front and rear walls of the opening. As will now be understood, counterclockwise rotation of lever 47 in response to the clockwise rotation of seat 21 will advance channel shaped member 37 in the direction of the arrow shown in FIG. 3 to project turtle head 15 outwardly of the shell. The actuated positions of seat 21, lever 47, spring 44 and head 15 are indicated in phantom lines in FIG. 3. It will also be understood that when the force applied to seat 21 to rotate it in the clockwise direction is removed, spring 43 will bias seat 21, lever 47, channel shaped member 37 and the turtle head 15 to the retracted, normal position.

A pair of front leg members 55 each have simulated turtle front legs 16 formed at one end thereof and pivot pins 56 formed at the rear end thereof. Pivot pins 56 extend through channel shaped member 37. Shell 11 is formed with leg openings 57 to permit the turtle front legs 16 to project therethrough with the normal retracted position being shown in full lines in FIG. 4. When channel shaped member 37 is advanced under the action of counterclockwise rotation of lever 47, it advances front leg members 55 in the direction of the arrows indicated in FIG. 4 to the phantom line position with the lowermost edges of turtle front legs 16 guiding along the top surface of bottom plate 31.

Figure 6:
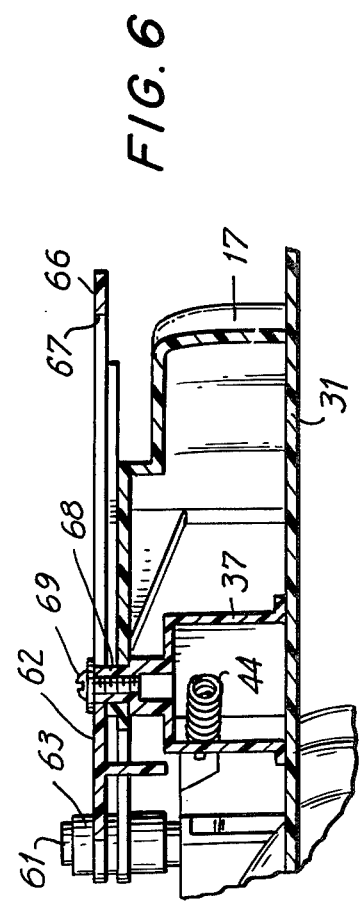
FIG. 6 is a partial sectional view taken along line 6—6 of FIG. 4.

At the rear end of bottom plate 31 is provided an upstanding post 61. A pair of rear leg members 62 are provided at the rear end of the shell. Each rear leg member 62 is formed with three arms. A first arm 63 carries a journal 64 which is rotatably mounted on post 61. A second arm 65 is formed to simulate a turtle rear leg 17. A third arm 66 is provided with an elongated slot 67. The slot 67 of each of the rear leg members 62 overlie each other in a V or X configuration as shown in FIG. 4. A post 68 as best seen in FIG. 6 projects upwardly from channel shaped member 37 and extends through the slots 67 on each of the third arms 66. A screw 69 having a head diameter greater than the width of the slots 67 is secured into the end of post 68 so that the third arms 66 do not become inadvertently dislodged from the post.

When rear leg members 62 are in the full lines position shown in FIG. 4, the turtle rear legs 17 are normally retracted as shown in full lines. Upon advancement of channel shaped member 37, each rear leg member 62 will be caused to pivot about post 61 as a result of the linear movement of post 68 in the slots 67. This effects an advancement of the turtle rear legs 17 in the arcurate direction shown by the arrows in FIG. 4. Upon retraction of channel shaped member 37 under the biasing of spring 44, the turtle rear legs 17 will be retracted.

When the vehicle thus described is at rest with no force applied to seat 21, the members simulating the turtle head and legs will be in a retracted and partially withdrawn position in relation to shell 11. When a child sits on seat 21, the weight of the child will cause seat 21 to pivot in a clockwise direction as viewed in FIG. 3 to thereby rotate lever 47 and advance channel shaped member 37 which thereupon effects advancement of the head and the four legs. By alternately applying and releasing pressure or weighting or unweighting the seat as a child might do while physically propelling the vehicle along a ground surface by foot action, the child can sequentially cause the head and leg simulating parts to be alternately advanced and retracted to thereby impart additional elements of play value to the vehicle.

A noise producing element may also be included such as a flexible rod 71 secured at one end to a boss 72 carried by bottom plate 31 and sequentially engaging ribs 73 formed on the inside of a wheel 14.

The invention has been disclosed in the shape of a turtle because the projection and retraction feature brings a turtle to mind. However, the structure of the invention can be incorporated in a vehicle regardless of the configuration. The primary purpose is to stimulate the imagination of the child providing for unlimited possibilities.

It will thus be seen that the objects set forth above, and those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a child's ride-on vehicle having a body and ground engaging wheels, the combination of a first member pivoted to said body, at least one second member movably mounted in said body for movement between a generally retracted position and a generally projecting position, actuating means acting between said first member and said second member for moving said second member in response to pivotal movement of said first member, operating means projecting through said body, and pivot means for pivoting said operating means to said second member.

2. A child's vehicle as claimed in claim 1 and further including spring means acting between said second member and said body for biasing said second member to said generally retracted position.

3. A child's vehicle as claimed in claim 2 wherein said second member is elongated and guide means are provided on said body for guiding said elongated member for linear movement.

4. A child's vehicle as claimed in claim 3 wherein said actuating means is a lever pivoted to said body and said first member forms a seat, a portion of which engages said lever, said lever also being in engagement with said elongated second member.

5. A child's vehicle as claimed in claim 4, wherein said operating means includes a pair of first operating elements, each having opposite ends, one end of each operating element projecting through said body and the other end including said pivot means for pivoting said end to said elongated second member.

6. A child's vehicle as claimed in claim 4, wherein said operating means includes a pair of second operating elements, each having three ends, one end of each second operating element projecting through said body, a second end of each second operating element being pivoted on said body and a third end of each second operating element being provided with an elongated slot, said pivot means being carried by said elongated second member and projecting through said slot.

7. A child's vehicle as claimed in claim 4, wherein said operating means includes a pair of first operating elements and said second member further includes a pair of second operating elements, each said first operating element having opposite ends, one end of each first operating element projecting through said body and the other end including said pivot means for pivoting said end to said elongated second member, each said second operating element having three ends, one end of each second operating element projecting through said body, a second end of each second operating element being pivoted on said body and a third end of each second operating element being provided with an elongated slot, and second pivot means carried by said elongated second member and projecting through said slot.

8. A child's vehicle as claimed in claim 7 wherein said second member has a portion thereof in the general configuration of a turtle head and wherein a portion of each of said first and second operating elements has the general configuration of turtle legs.

* * * * *